United States Patent [19]

Nelson

[11] 4,363,842

[45] Dec. 14, 1982

[54] ELASTOMERIC PRE-STRETCHED TUBES FOR PROVIDING ELECTRICAL STRESS CONTROL

[75] Inventor: Paul N. Nelson, Stillwater, Minn.

[73] Assignee: Minnesota Mining and Manufacturing Company, Saint Paul, Minn.

[21] Appl. No.: 239,538

[22] Filed: Mar. 2, 1981

[51] Int. Cl.³ .................. B32B 1/08; H02G 15/08
[52] U.S. Cl. .................. 428/36; 138/DIG. 5; 156/86; 174/68 A; 174/73 R; 174/DIG. 8; 428/222; 428/323; 428/324; 428/328; 428/913
[58] Field of Search .......... 428/36, 222, 323, 324, 428/328, 913; 156/86; 174/DIG. 8, 68 A, 73 R; 138/115, 119, DIG. 5

[56] References Cited

U.S. PATENT DOCUMENTS

| | | | |
|---|---|---|---|
| 3,349,164 | 10/1967 | Wyatt | 174/73 R |
| 3,515,798 | 6/1970 | Sievert | 138/122 |
| 4,053,702 | 10/1977 | Erickson et al. | 174/73 R |
| 4,233,731 | 11/1980 | Clabburn et al. | 428/913 |
| 4,234,439 | 11/1980 | Kehr et al. | 174/73 R |

*Primary Examiner*—Paul J. Thibodeau
*Attorney, Agent, or Firm*—Cruzan Alexander; Donald M. Sell; Gerald F. Chernivec

[57] ABSTRACT

An elastomeric pre-stretched tubular member comprising from about 2.5 to about 25 volume percent carbon black, from about 0.8 to about 3.0 volume percent of platelet-shaped conductive particles, and optionally high permittivity inorganic fillers and platelet-shaped inorganic dielectric fillers, with the balance being the compounded elastomeric component.

10 Claims, No Drawings

ELASTOMERIC PRE-STRETCHED TUBES FOR PROVIDING ELECTRICAL STRESS CONTROL

TECHNICAL FIELD

The invention relates to high permittivity elastomeric pre-stretched tubular members for favorably influencing electric fields associated with the splicing and termination of high voltage power cables. The tubular member comprises a non-polar polymeric base material, a substantive amount of very fine polarizable particles capable of increasing the permittivity of the composition and an effective amount of platelet-shaped conductive particles. Typically, the tubes, together with the cable insulating materials which have low permittivity, act upon electrical fields in the sense of refraction.

BACKGROUND ART

Compositions of the general type indicated above, i.e., wherein high permittivity is sought, are known, for example, from U.S. Pat. Nos. 3,258,522 and 3,287,489, along with British Pat. No. 1,394,272, all of which disclose the use of carbon black in the development of high permittivity elastomeric compositions. Further, the use of ceramic or high permittivity inorganic fillers in compositions is disclosed in U.S. Pat. Nos. 3,585,274; 3,673,305; 3,816,639; 3,823,334; 3,828,115; and 4,053,702. The combination of carbon black and planarly oriented conductive platelets in highly polar organic polymer bases, in the form of thin films, has been shown to provide high permittivity with high dielectric strength, as is disclosed in U.S. Pat. No. 3,349,164. Other known configurations include multi-layer heat shrink products which consist of a low permittivity heat shrinkable polymeric cover which has been internally coated with an elastomeric layer which provides high permittivity principally through the incorporation of silicone carbide particles, although conducting particulate fillers may also be included: see for example U.S. Pat. No. 3,950,604. Combinations of electrically conducting and insulating flakes are also known, as is disclosed in U.S. Pat. No. 4,234,439.

The usefulness of inorganic particulate materials such as barium titanate and titanium dioxide as high permittivity components for compositions having or exhibiting a refractive stress controlling action has been known for a long time, but the desirable elastomeric properties were overlooked; see for example U.S. Pat. Nos. 3,673,305 and 3,823,334. In this connection, it has been found that when inorganic materials of very high permittivity are utilized, e.g., barium titanate having a permittivity of approximately 6,000 to 10,000, the permittivity of the elastomeric composition cannot be increased beyond approximately 20 if the composition is to retain the desirable elastomeric properties of the base material. In other words, in order to provide satisfactory permittivity, the proportion of inorganic material becomes so high as to preclude the manufacture of practical stress control elements having adequate elastomeric characteristics for providing gap-free contact with electric power cables.

This invention provides high permittivity stress control for high voltage power cable terminations with greatly improved impulse strength. Furthermore, the mechanical strength and high elastic memory are sufficient for the pre-stretched tube delivery during application.

There are other stress controlling devices which contain materials mainly acting in a resistive manner. Such materials have the inherent disadvantage that an increase in resistivity under overload conditions may result in excessive heating and accellerated aging of the material, which can ultimately lead to electrical breakdown. Conversely, this invention acts, together with the cable insulating materials of low permittivity, upon electrical fields in the sense of refraction.

The application of pre-stretched tubular high permittivity stress control elements requires less knowledge and skill than the application of other stress control devices, such as the mounting of conductive stress control cones, the wrapping of stress control tapes, the molding of flowable or shapeable masses having stress controlling properties which subsequently harden at the site of installation, etc. Tubular termination designs also provide favorable economics to both the supplier and user, as less material is utilized, ultimate diameters are smaller, and creepage lengths between conductor and ground are shortened, thereby reducing space requirements at the installation site.

DISCLOSURE OF THE INVENTION

In accordance with the invention there is provided an elastomeric pre-stretched tubular member comprising from about 2.5 to about 25 volume percent carbon black, from about 0.8 to about 3.0 volume percent of platelet-shaped conductive particles, up to about 8.0 volume percent of high permittitivity inorganic fillers, up to about 12.0 volume percent of platelet-shaped inorganic dielectric fillers, with the balance of the member comprising a compounded elastomer.

DETAILED DESCRIPTION

The pre-stretched tubular member of this invention is supported in a stretched condition on an easily removable core, such a device being typically designated a "PST", which of course stands for pre-stretched tube. The core can be external, i.e. on the outside of the tubular member, or can be inside the tubular member, such as is taught in U.S. Pat. No. 3,515,798, incorporated herein by reference. Preferably the core is internal and is a one-piece rigid spiral core having interconnected adjacent coils in a closed helix configuration, as is taught in U.S. Pat. No. 4,515,798.

By utilizing this PST technique, a completely insulated termination can be applied in a one step operation. The application consists essentially of a high permittivity tube covered by an arc/track and weather resistant insulation which is applied to the prepared cable simultaneously upon core removal. This can provide a completely insulated termination in which the electric field stresses are controlled effectively by the high permittivity tube through the refraction of electric flux lines at the interface between the cable insulation and high permittivity tube. Another characteristic of a PST which more directly pertains to the method in which it is applied, is cold shrink. This implicitly means that such devices may be applied to cables without the necessity of a heat source, as is conventionally used with heat shrink tubing. Rather, the characteristics of shrinking behavior are a function of superior elastic memory characteristics of the composition used in the manufacture of the tubular member.

The elastomeric tubular member should contain from about 2.5 to about 25 percent by volume carbon black. The carbon black may consist of essentially any commercial grade, from the large particulate size thermal types of the fine reinforcing furnace grades, including the materials termed conductive carbon black. The preferred carbon black is a coarse furnace grade (i.e., having an average particle diameter of from about 40 to about 100 nanometers), and with this material, from about 10 to about 20 volume percent of the member composition is preferred. Carbon black is necessary to achieve an effective refraction of electric flux lines in the terminating device, and yet allow maintenance of a desired level of elasticity. Typically, the larger the particle size of the carbon black and the lower the structure thereof, the greater the volume fraction thereof is necessary.

In addition to carbon black, it has been determined that from about 0.8 to about 3.0 percent by volume of the elastomeric composition must be comprised of platelet-shaped conductive particles, typically metallic flakes, with from about 1.2 to about 1.8 percent thereof by volume being preferred. Such flakes must be sufficiently fine to disperse readily and uniformly in the elastomeric base material and not contribute to excessive gas evolution during the vulcanization process (if such is necessary), nor detract significantly from the physical properties of the resultant elastomeric tube.

Aluminum platelets are most preferred, and other metallic particles, such as copper platelets can also be utilized.

It has been determined that the minimum amount of such platelets must be present in order to achieve desired impulse strength performance, which refers to the ability of the termination to withstand the potential damaging effects caused by lightning strike surges or other transient surges on the high voltage electrical line.

While not absolutely essential to functionality of the invention, it has been determined that the incorporation of high permittivity inorganic fillers can provide desirable results in the composition. Examples of such materials include barium titanate, titanium dioxide, strontium titanate, etc. The use of such materials can provide superior permittivity stability over a range of electrical stresses and can assist in the generation of lower electrical loss for a given permittivity level. Up to about 8.0 percent by volume of these fillers can be included, with less than about 5.0 percent being preferred.

In addition, again while not essential to functionality, the incorporation of platelet-shaped inorganic fillers having dielectric characteristics can provide an improvement in the electrical strength of the invention. For example, the use of mica having particle diameters of from about 8 to about 40 micrometers and thicknesses of from about 0.5 to about 1.0 micrometers has discernably increased the dielectric strength of the elastomer composition, which in turn relates to superior AC breakdown strength of the electrical termination. This component can be present at up to about 12 volume percent, with less than about 5 volume percent being preferred.

The balance of the composition comprises the compounded elastomeric component thereof. By the term compounded is meant normal conventional operations in which ingredients are added to provide the required processing behavior and physical properties of the elastomeric device. Processing could entail open mill or internal mixing, extrusion, steam autoclave or continuous vulcanization or molding techniques. In keeping with conventional preparation of such elastomeric materials, typical process aids, process oils, coupling agents, and vulcanizing agents (if necessary) are included in the compounded elastomeric component.

For the preparation of my PST, it has been determined that only EPDM (ethylene-propylene-diene monomer system) and EPM (ethylene-propylene copolymers) elastomers provide the necessary physical characteristics.

As aforementioned, one of the key characteristics for a termination is the impulse strength, which is tested by means of the Basic Impulse Insulation Level (BIL). BIL is defined as the shock wave (1.2×50 microseconds) and a minimum voltage level, depending on the cable rating, that the termination must endure without electrical flashover or breakdown. (IEEE Std. 4-1978.) The desired performance level for a 20 KV termination having a 330 millimeter cutback (i.e., the distance from the exposed conductor to the cable shield or ground potential) is as follows:

| | |
|---|---|
| Maximum Impulse Withstand (Positive and Negative) | Greater than 150 KV |
| 100 Percent Impulse Flashover Level (Positive and Negative) | Greater than 160 KV |
| Average AC Flashover | Greater than 80 KV |
| AC Breakdown Strength | Greater than 100 KV |

The AC breakdown strength should exceed the AC flashover level by at least 20 KV for the purpose of insulation coordination of the power line and to provide a margin of safety for the terminating device.

In addition to the foregoing electrical criteria, adequate physical performance criteria for a PST are as follows:

| | | | |
|---|---|---|---|
| ASTM | D-412 | 100 Percent Modulus | Less than 300 PSI (2.07 MPa) |
| ASTM | D-412 | Ultimate Tensile Strength | Greater than 1000 PSI (6.90 MPa) |
| ASTM | D-412 | Ultimate Elongation | Greater than 400% |
| ASTM | D-624 | Die C Tear Strength | Greater than 150 PLI (26.3 kN/m) |
| Permanent Set | | | Less than 30% |

Permanent set is a measure of the elastic memory of a cured elastomer. Excellent elastic memory will typically allow for coverage of a broad range of cable or workpiece diameters with a minimum number of sizes of pre-stretched articles. For adequate sealability and optimum product versatility, the permanent set should not exceed about 30 percent. To ascertain permanent set, a sample is subjected to a preselected strain at a specified temperature for a period of time, and released, whereupon the distance (diameter, length, etc.) that is unrecovered can be measured. The conditions herein involve stretching the specimen 100 percent for 22 hours at 100° C., following which the samples are allowed to equilibrate for one hour at room temperature. The samples are then released, and after a 30 minute recovery period, are measured. The following formula is then utilized to calculate permanent set:

$$\text{Percent Permanent Set} = \frac{L_{30} - L_i}{L_s - L_i} \times 100$$

wherein $L_i$ is the original length between benchmarks, typically one inch; $L_s$ is the stretched length between benchmarks, e.g., at 100 percent stretch, this would be two inches; and $L_{30}$ is the length between benchmarks after the 30 minute recovery period.

The invention will now be more specifically defined by the aid of the following non-limiting examples, wherein all parts are by weight unless otherwise specified.

EXAMPLE 1

An elastomeric material was prepared by utilizing the following composition:

|  | Parts by Weight |
|---|---|
| Nordel 1470 (tradename for an ethylene/propylene/diene monomer rubber commercially available from DuPont | 50 |
| Nordel 1440 (tradename for an ethylene/propylene/diene monomer rubber commercially available from DuPont | 50 |
| Zinc Oxide | 5.0 |
| N754 Carbon Black (a coarse grade commercially available from Columbian Chemical) | 74.1 |
| 4232 NEW CT ff Aluminum Flakes (tradename for non-leafing aluminum flakes of 25 micrometer average particle diameter (90 percent through 325 mesh) commercially available from Eckart-Werke) | 8.7 |
| Silene D (tradename for an amorphous silica from Pittsburgh Plate Glass) | 15 |
| Sunpar 2280 (tradename for a paraffinic oil commercially available from the Sun Company) | 30 |
| D-148 (tradename for a processing aid commercially available from Ventron) | 2.5 |
| SR 297 (tradename for 1,3 butylene dimethacrylate commercially available from the Sartomer Company) | 5.0 |
| Silane A-172 (tradename for a vinyl silane coupling agent commercially available from Dow Chemical) | 1.0 |
| Vul-Cup 40KE (tradename for a difunctional peroxide commercially available from Hercules) | 4.2 |

This provides for a concentration in percent by volume of 18.7 for carbon black and 1.5 for the aluminum flakes. (Concentration level is specified in terms of volume percentage because electrical characteristics are dependent on the spacial arrangement of filler particles.)

The composition was extruded into high permittivity tubing using a conventional cold feed extruder and vulcanized in a steam autoclave. The tubing was electrically tested using a 20 KV tubular termination design having a 330 millimeter shield cut-back (the distance from the exposed conductor to cable shield or ground potential). Such testing indicated that the tubing could withstand a maximum impulse on the positive side of 176 KV and 192 KV on the negative side; the 100 percent impulse flashover level was 189 KV on the positive side and 204 KV on the negative side; the average AC flashover was found to be 96 KV; and the AC breakdown strength was found to be 125 KV.

As for the physical properties of the tubular sample, same exhibited a 100 percent modulus of 241 PSI; an ultimate tensile strength of 1,454 PSI; an ultimate elongation of 643 percent; a Die C tear strength of 241 PLI; the permanent set was found to be 16.4 percent; and the permittivity, i.e., specific inductance capacitance (SIC), measured in the axial direction with 60 percent radial expansion, was found to be 37.6.

EXAMPLE 2

An elastomeric composition was prepared as per Example 1 using the following components:

|  | Parts by Weight |  |
|---|---|---|
| Nordel 1470 | 50 |  |
| Nordel 1440 | 50 |  |
| Zinc Oxide | 5 |  |
| N754 Carbon Black | 73.1 |  |
| 4232 CT ff Aluminum Flakes | 7.1 |  |
| K-Fil 19 (a barium titanate from NL Industries) | 39.2 |  |
| Silene D | 15 |  |
| Sunpar 2280 | 30 |  |
| D-148 | 2.5 |  |
| SR 297 | 5 |  |
| Silane A-172 | 1 |  |
| Vul-Cup 40KE | 4.2 |  |

|  | % by Weight | % by Volume |
|---|---|---|
| Carbon Black | 25.9 | 18.0 |
| Aluminum Flakes | 2.5 | 1.2 |
| Barium Titanate | 13.9 | 3.0 |

|  | Pos. | Neg. |
|---|---|---|
| Maximum Impulse Withstand, KV | 185 | 164 |
| 100% Impulse Flashover Level, KV | 198 | 181 |
| Average AC Flashover, KV | 104 |  |
| AC Breakdown Strength, KV | 145 |  |
| 100% Modulus | 217 PSI (1.50 MPa) |  |
| Ult. Tensile | 1249 PSI (8.61 MPa) |  |
| Ult. Elongation | 480% |  |
| Die C Tear | 182 PLI (31.9 kN/m) |  |
| Permanent Set | 15.2% |  |
| Permittivity | 22.0 |  |

This example illustrates the presence of barium titanate in addition to carbon black and metallic flakes, with maintenance of suitable electrical and physical properties.

EXAMPLE 3

An elastomeric composition was prepared as per Example 1 using the following components:

|  | Parts by Weight |
|---|---|
| Nordel 1470 | 50 |
| Nordel 1440 | 50 |
| Zinc Oxide | 5 |
| N550 Carbon Black, a coarse grade commercially available from Columbian Chemical | 43.7 |
| 4232 CT ff Aluminum Flakes | 8.0 |
| 4X Mineralite Mica, from Thompson Hayward Chemical | 20 |
| Sunpar 2280 | 30 |
| D148 | 2 |
| Struktol WB16, a calcium fatty acid salt from Struktol Co. | 2 |
| SR297 | 5 |
| Silane Al72 | 1 |
| Vul-Cup 40KE | 4.4 |

|  | % by Weight | % by Volume |
|---|---|---|
| Carbon Black | 19.8 | 12.0 |
| Aluminum Flakes | 3.6 | 1.5 |
| Mica | 9.0 | 3.7 |

|  | Pos. | Neg. |
|---|---|---|
| Maximum Impulse Withstand, KV | 150 | 151 |
| 100% Impulse Flashover Level, KV | 162 | 164 |
| Average AC Flashover, KV | | 116 |
| AC Breakdown Strength, KV | 160 | |
| 100% Modulus | 287 PSI (1.98 MPa) | |
| Ult. Tensile | 1343 PSI (9.26 MPa) | |
| Ult. Elongation | 529% | |
| Die C Tear | 212 PLI (37.1 kN/m) | |
| Permanent Set | 23.3% | |
| Permittivity | 16.1 | |

This example contained mica, an insulating platelet material, and satisfactory results were obtained.

EXAMPLE 4

An elastomeric composition was prepared as per Example 1 using the following components:

|  | Parts by Weight |
|---|---|
| Nordel 1470 | 50 |
| Nordel 1440 | 50 |
| Zinc Oxide | 5 |
| Furnex N754 | 61.2 |
| Copper Powder No. 129U, a copper flake available from Atlantic Powdered Metals | 27.8 |
| 4X Mica | 20 |
| Sunpar 2280 | 30 |
| D148 | 2 |
| Struktol WB16 | 2 |
| SR297 | 5 |
| Silane A172 | 1 |
| Vul-Cup 40KE | 13.2 |

|  | % by Weight | % by Volume |
|---|---|---|
| Carbon Black | 23.7 | 16.0 |
| Copper Flakes | 10.7 | 1.5 |
| Mica | 7.7 | 3.5 |

|  | Pos. | Neg. |
|---|---|---|
| Maximum Impulse Withstand, KV | 206 | 216 |
| 100% Impulse Flashover Level, KV | 218 | 229 |
| Average AC Flashover, KV | | 85 |
| AC Breakdown Strength, KV | | 108 |
| 100% Modulus | 180 PSI (1.24 MPa) | |
| Ult. Tensile | 1268 PSI (8.74 MPa) | |
| Ult. Elongation | 684% | |
| Die C Tear | 178 PLI (31.2 kN/m) | |
| Permanent Set | 27.1% | |
| Permittivity | 24.2 | |

The above composition utilizes copper in place of aluminum and satisfactory results are obtained.

EXAMPLE 5

An elastomeric composition was prepared as per Example 1 using the following components:

|  | Parts by Weight |
|---|---|
| Nordel 1470 | 50 |
| Nordel 1440 | 50 |
| Zinc Oxide | 5 |
| Furnex N754 | 61.2 |
| 5-XD Powder, a leafing aluminum flake from Reynolds Aluminum Pigments | 8.7 |
| 4X Mica | 20 |
| Sunpar 2280 | 30 |
| D148 | 2 |
| Struktol WB16 | 2 |
| SR297 | 5 |
| Silane A172 | 1 |
| Vul-Cup 40KE | 4.4 |

|  | % by Weight | % by Volume |
|---|---|---|
| Carbon Black | 25.6 | 16.0 |
| Aluminum Flakes | 3.6 | 1.5 |
| Mica | 8.4 | 3.5 |

|  | Pos. | Neg. |
|---|---|---|
| Maximum Impulse Withstand, KV | 202 | 204 |
| 100% Impulse Flashover Level, KV | 219 | 216 |
| Average AC Flashover, KV | | 84 |
| AC Breakdown Strength, KV | | 120 |
| 100% Modulus | 209 PSI (1.44 MPa) | |
| Ult. Tensile | 1196 PSI (8.25 MPa) | |
| Ult. Elongation | 737% | |
| Die C Tear | 196 PLI (34.3 kN/m) | |
| Permanent Set | 24.3% | |
| Permittivity | 25.1 | |

The above composition meets performance requirements utilizing a leafing-type aluminum platelet.

EXAMPLE 6

An elastomeric composition was prepared as per Example 1 using the following components:

|  | Parts by Weight |
|---|---|
| Nordel 1470 | 50 |
| Nordel 1440 | 50 |
| Zinc Oxide | 5 |
| Furnex N754 | 61.2 |
| MD 2000, non-leafing aluminum flakes of 45 micrometer average particle diameter (greater than 80 percent through 325 mesh) available from Alcan Ingot Powders | 8.4 |
| 4X Mica | 20 |
| Sunpar 2280 | 30 |
| D148 | 2 |
| Struktol WB16 | 2 |
| SR297 | 5 |
| Silane A172 | 1 |
| Vul-Cup 40KE | 4.4 |

|  | % by Weight | % by Volume |
|---|---|---|
| Carbon Black | 25.6 | 16.0 |
| Aluminum Flakes | 3.5 | 1.5 |
| Mica | 8.4 | 3.5 |

|  | Pos. | Neg. |
|---|---|---|
| Maximum Impulse Withstand, KV | 198 | 164 |
| 100% Impulse Flashover Level, KV | 214 | 178 |
| Average AC Flashover, KV | | 86 |
| AC Breakdown Strength, KV | | 131 |
| 100% Modulus | 207 PSI (1.43 MPa) | |
| Ult. Tensile | 1302 PSI (8.98 MPa) | |
| Ult. Elongation | 769% | |
| Die C Tear | 190 PLI (33.3 kN/m) | |
| Permanent Set | 24.7% | |
| Permittivity | 20.8 | |

The above composition meets requirements utilizing a larger particle size non-leafing aluminum flake.

I claim:

1. An article for use in the splicing and termination of electric power cables comprising an elastomeric tubular member supported in a stretched condition on an easily removable core, said tubular member comprising from about 2.5 to about 25 volume percent carbon black, from about 0.8 to about 3.0 volume percent of platelet-shaped conductive particles, up to about 8.0 volume percent of high permittivity inorganic fillers, up to about 12.0 volume percent of platelet-shaped inorganic dielectric fillers, the balance of said member comprising a compounded non-polar elastomer selected from the group consisting of EPDM and EPM.

2. The article of claim 1 wherein said carbon black is a coarse furnace grade having an average particle diameter of from about 40 to about 100 nanometers.

3. The article of claim 2 wherein said carbon black comprises from about 10 to about 20 volume percent thereof.

4. The article of claim 1 wherein said dielectric filler comprises less than about 5 volume percent thereof.

5. The article of claim 1 wherein said dielectric filler is mica.

6. The article of claim 1 wherein said conductive particles are aluminum.

7. The article of claim 6 wherein said aluminum particles have an average diameter of about 25 micrometers.

8. The article of claim 1 wherein conductive particles are present at from about 1.2 to about 1.8 volume percent thereof.

9. The article of claim 1 wherein said core is a one-piece rigid spiral core having interconnected adjacent coils in a closed helix configuration.

10. The article of claim 1 wherein said high permittivity inorganic fillers comprise barium titanate.

* * * * *

UNITED STATES PATENT AND TRADEMARK OFFICE
CERTIFICATE OF CORRECTION

PATENT NO. : 4,363,842
DATED : December 14, 1982
INVENTOR(S) : Nelson

It is certified that error appears in the above—identified patent and that said Letters Patent is hereby corrected as shown below:

In column 2, line 46, "4,515,798" should read -- 3,515,798 --.

In column 7, line 8, "160" should be lined up under "116" of line 7.

In column 8, line 55, "131" should be lined up under "86" of line 7.

Signed and Sealed this

First Day of March 1983

[SEAL]

Attest:

GERALD J. MOSSINGHOFF

Attesting Officer

Commissioner of Patents and Trademarks